US008952854B2

(12) United States Patent
Fellows et al.

(10) Patent No.: US 8,952,854 B2
(45) Date of Patent: Feb. 10, 2015

(54) ANTENNA SPOILER AND METHOD OF MANUFACTURE

(75) Inventors: Jeremy P. Fellows, Lake Orion, MI (US); Gregg R. Kittinger, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 924 days.

(21) Appl. No.: 13/046,422

(22) Filed: Mar. 11, 2011

(65) Prior Publication Data

US 2012/0229351 A1    Sep. 13, 2012

(51) Int. Cl.
| H01Q 1/32 | (2006.01) |
| H01Q 9/46 | (2006.01) |
| H01Q 5/00 | (2006.01) |
| H01Q 9/30 | (2006.01) |
| H01Q 21/28 | (2006.01) |

(52) U.S. Cl.
CPC .............. *H01Q 9/46* (2013.01); *H01Q 1/3291* (2013.01); *H01Q 5/0048* (2013.01); *H01Q 9/30* (2013.01); *H01Q 21/28* (2013.01)
USPC ........................................................ 343/713

(58) Field of Classification Search
CPC ............................ H01Q 1/325; H01Q 1/3275
USPC ................................................... 343/711, 713
See application file for complete search history.

(56) References Cited

U.S. PATENT DOCUMENTS 6,927,736 B1 *   8/2005   Kornbau et al. ............... 343/712
2007/0013594 A1 *   1/2007   Yegin et al. .................... 343/713

FOREIGN PATENT DOCUMENTS

EP            1843429 A1 *  10/2007   ............... H01Q 1/32

OTHER PUBLICATIONS

Utility U.S. Appl. No. 12/700,515, filed Feb. 4, 2010.

* cited by examiner

*Primary Examiner* — Robert Karacsony
(74) *Attorney, Agent, or Firm* — Ingrassia Fisher & Lorenz, P.C.

(57) ABSTRACT

Antenna spoilers and methods of manufacturing the antenna spoilers are provided. An antenna spoiler for a vehicle includes a spoiler housing, an antenna element, and an amplifier. The spoiler housing is created by blow molding. The antenna element is disposed within the spoiler housing. The amplifier is coupled to the antenna element, and is disposed within the spoiler housing.

16 Claims, 7 Drawing Sheets

ANTENNA SPOILER AND METHOD OF MANUFACTURE

TECHNICAL FIELD

The present disclosure generally relates to the field of vehicles and, more specifically, to antenna spoilers for vehicles and methods of manufacturing antenna spoilers for vehicles.

BACKGROUND

Automobiles and various other vehicles utilize antennas for communications, such as for receiving radio signals. Antennas are often mounted on a roof of the vehicle or on a rear window of the vehicle. However, such antenna placement may not always be optimal or feasible, for example convertibles with retractable rooftops.

Accordingly, it is desirable to provide improved antennas for vehicles, for example that do not require placement on a roof or rear window of the vehicle. It is also desirable to provide improved methods for manufacturing such antennas. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, an antenna spoiler for a vehicle is provided. The antenna spoiler comprises a spoiler housing, an antenna element, and an amplifier. The antenna element is disposed within the spoiler housing. The amplifier is coupled to the antenna element, and is disposed within the spoiler housing.

In accordance with another exemplary embodiment, a method for manufacturing an antenna spoiler for a vehicle is provided. The method comprises the steps of creating a spoiler housing via blow molding and inserting an antenna system within the spoiler housing.

In accordance with a further exemplary embodiment, an antenna spoiler for a vehicle is provided. The antenna spoiler comprises a spoiler housing and an antenna system. The antenna system is disposed within the spoiler housing, and comprises an antenna element and an amplifier. The antenna element is disposed within the spoiler housing, and is configured to receive amplitude modulation (am) radio signals and frequency modulation (fm) radio signals. The amplifier is coupled to the antenna element, and is disposed within the spoiler housing.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
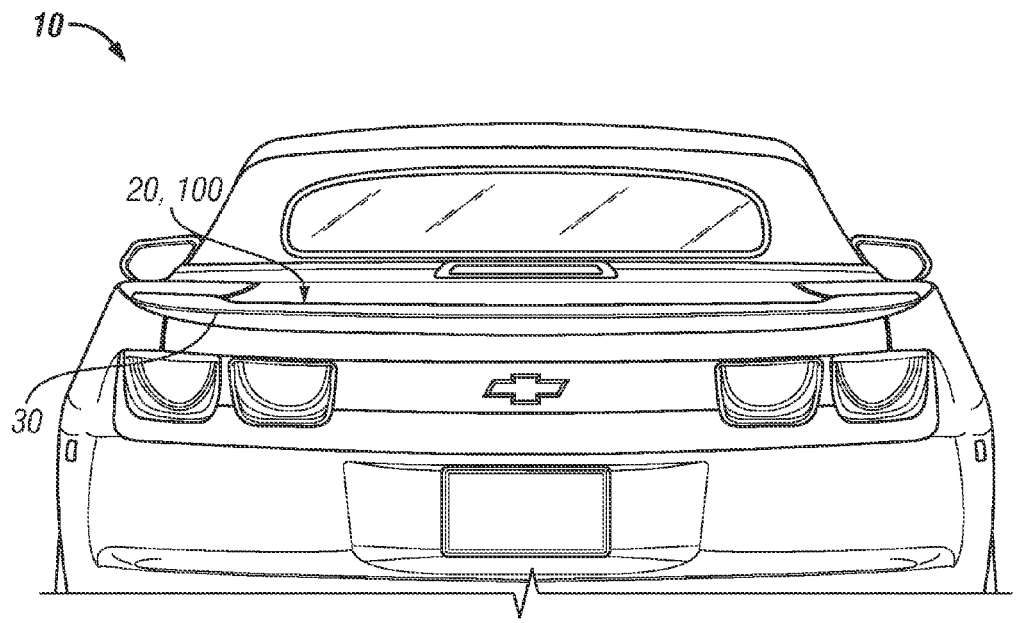
FIG. 1 is a schematic plan view of an automobile having an antenna spoiler, in accordance with an exemplary embodiment.

FIG. 1 is a schematic drawing of a vehicle 10. The vehicle has a spoiler 20 above and attached to a deck lid 30. The spoiler 20 comprises an antenna spoiler 100, as described below. Specifically, the antenna spoiler 100 comprises a deck lid spoiler with an integrated radio antenna for a vehicle. The antenna spoiler 100 is preferably disposed against the deck lid 30 of the vehicle, most preferably adjacent to and immediately above the deck lid. In certain embodiments, the vehicle comprises an automobile, such as a sedan, a sport utility vehicle, a van, or a truck. In one preferred embodiment, the vehicle comprises a convertible automobile with a retractable rooftop. However, the antenna spoiler 100 may also be used in various other types of vehicles.

Figure 2:
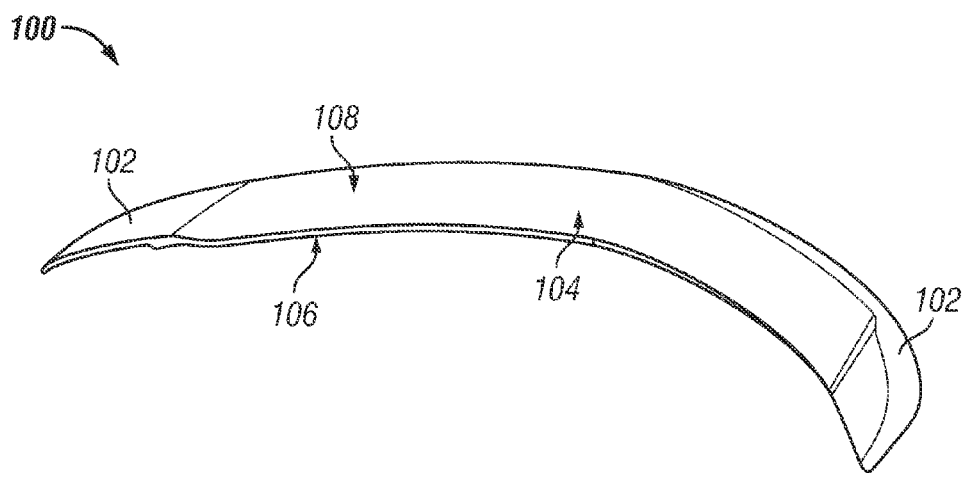
FIG. 2 is a top plan view of an antenna spoiler for a vehicle, such as the vehicle of FIG. 1, that includes a housing and an antenna system disposed within the housing, in accordance with an exemplary embodiment.
Figure 3:
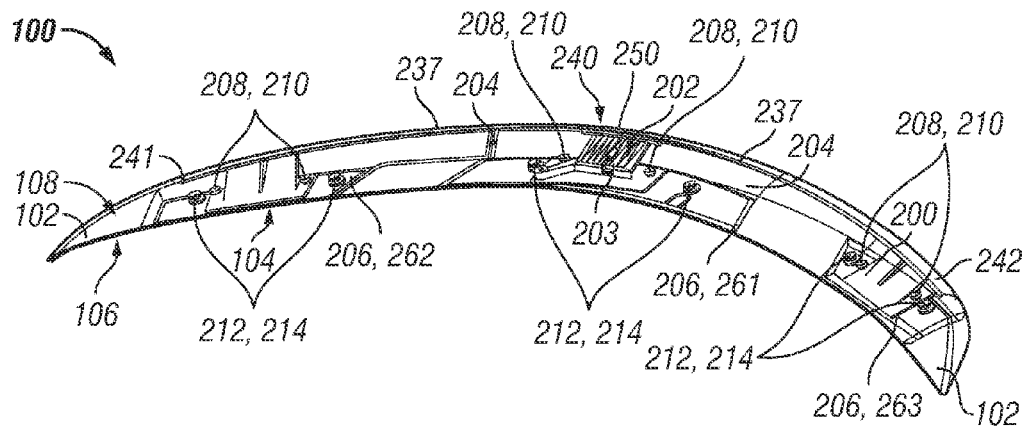
FIG. 3 is a semi-transparent plan view of the antenna spoiler of FIG. 2, showing the antenna system within the housing, in accordance with an exemplary embodiment.
Figure 4:
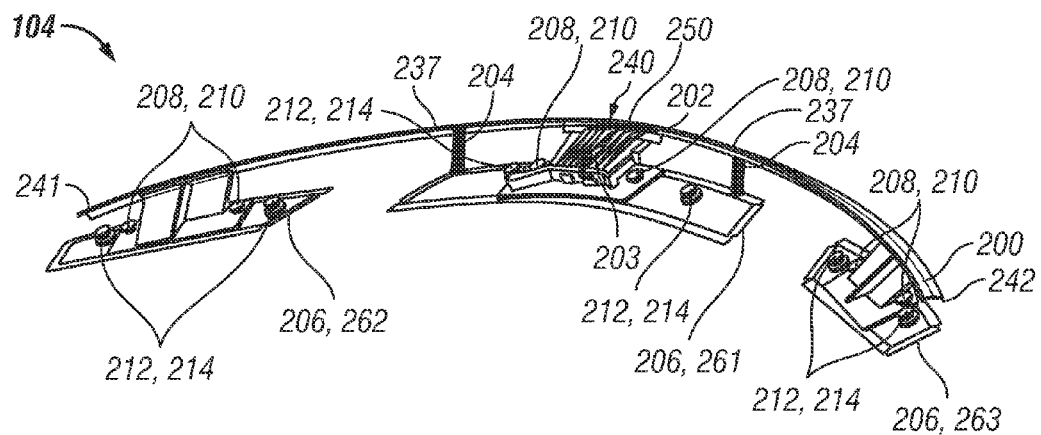
FIG. 4 is a schematic view of the antenna system of the antenna spoiler of FIG. 2, in accordance with an exemplary embodiment.
Figure 5:
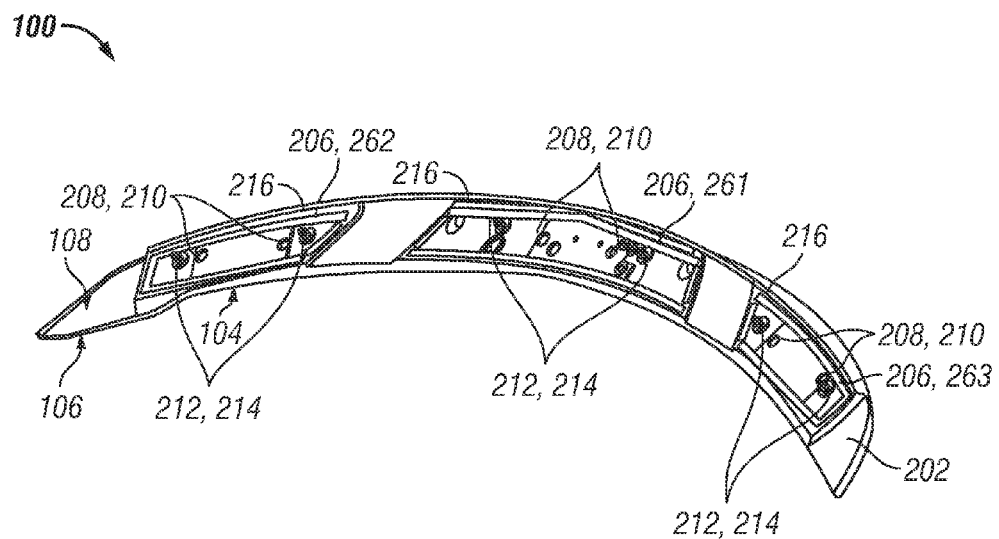
FIG. 5 is a bottom plan view of the antenna spoiler of FIG. 2, showing the antenna system within the housing, in accordance with an exemplary embodiment.
Figure 6:
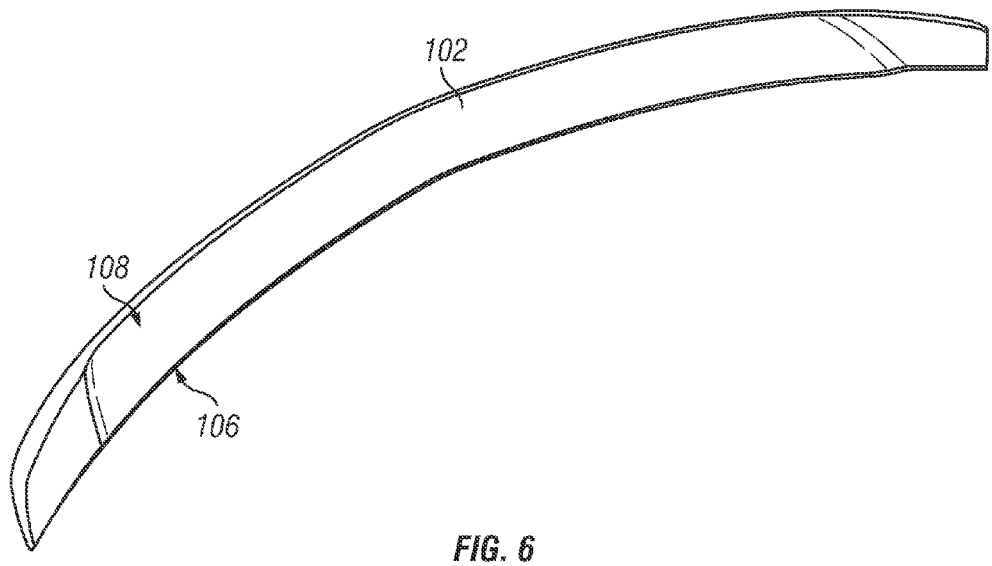
FIG. 6 is a schematic view of the housing of the antenna spoiler of FIG. 2, depicted during manufacture of the antenna spoiler prior to integration of the housing and the antenna system, in accordance with an exemplary embodiment.
Figure 7:
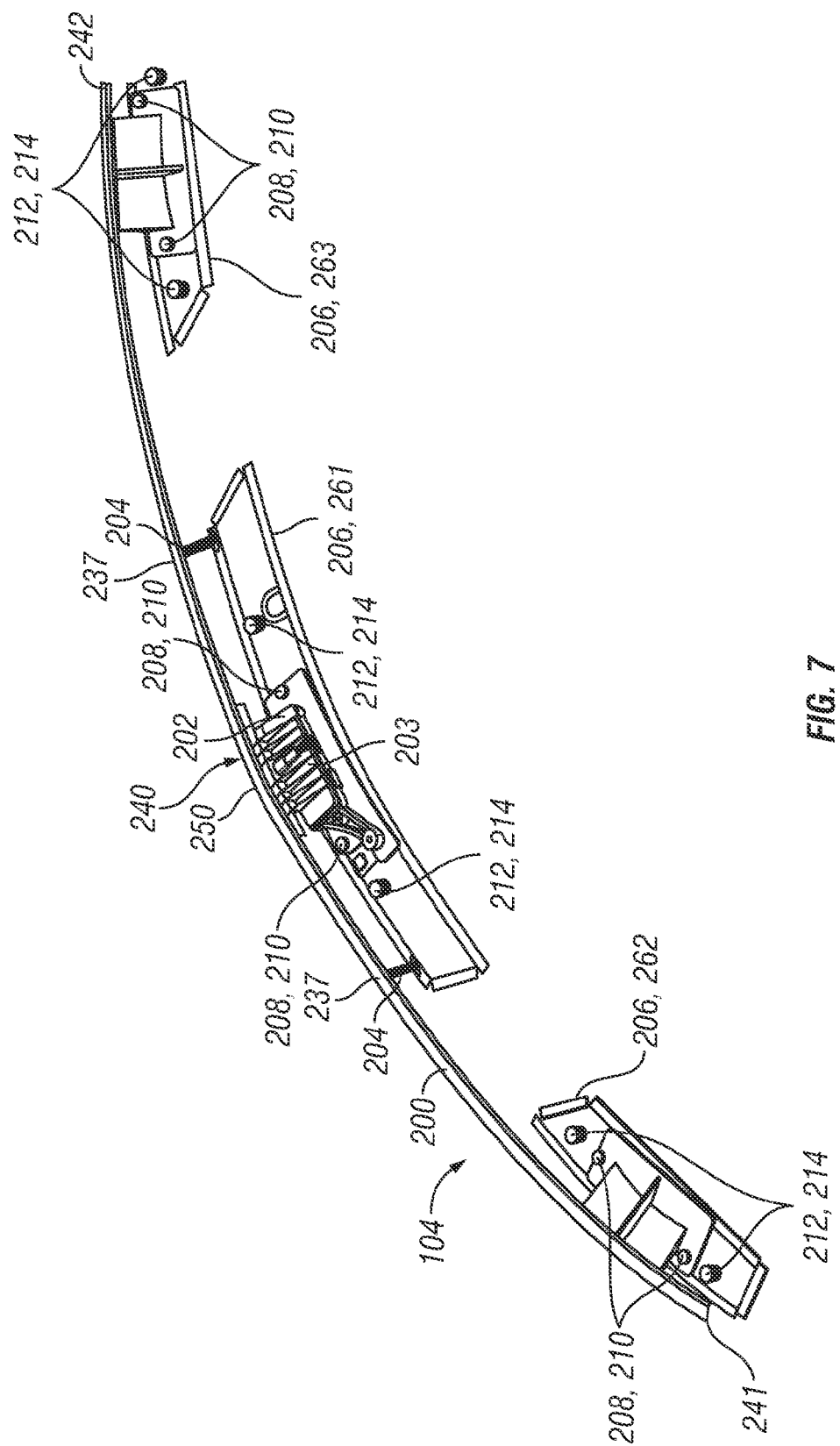
FIG. 7 is a schematic view of the antenna system of the antenna spoiler of FIG. 2, depicted during manufacture of the antenna spoiler prior to integration of the housing and the antenna system, in accordance with an exemplary embodiment.

FIGS. 2-7 are schematic drawings of the vehicle antenna spoiler 100 of FIG. 1. The antenna spoiler 100 has a housing 102 and an antenna system 104. Specifically, FIG. 2 is a top plan view of the antenna spoiler 100; FIG. 3 is a semi-transparent plan view of the antenna spoiler 100 (depicted without the housing 102 for illustrative purposes); FIG. 4 is a schematic view of the antenna system 104 of the antenna spoiler 100; FIG. 5 is a bottom plan view of the antenna spoiler 100; FIG. 6 is a schematic view of the housing 102 of the antenna spoiler 100, depicted during manufacture of the antenna spoiler 100 prior to integration of the housing 102 and the antenna system 104; and FIG. 7 is a schematic view of the antenna system 104 of the antenna spoiler 100, also depicted during manufacture of the antenna spoiler 100 prior to integration of the housing 102 and the antenna system 104, in accordance with an exemplary embodiment.

The housing 102 includes an inner wall 106 and an outer wall 108. The housing 102 is preferably made of a plastic material, most preferably from an ABS plastic material. The housing 102 is preferably created via a blow molding technique, as is described further below in connection with the process 900 of FIG. 9.

The antenna system 104 is disposed within the housing 102. In a preferred embodiment, the antenna system 104 is disposed underneath the inner wall 106 in an interior region of the antenna spoiler 100, and the entire antenna spoiler 100 (including the housing 102 and the antenna system 104) is configured to be placed on top of and against a deck lid of the vehicle. As such, the antenna system 104 is not visible once the antenna spoiler 100 is assembled.

The antenna system 104 includes an antenna element 200 and an amplifier assembly 202 having an amplifier 203, each of which are disposed within the housing 102 underneath the inner wall 106 and configured for placement above the deck lid. In the depicted embodiment, the antenna system 104 also includes supports 204, support covers 206, access cover nuts 208, access cover screws 210, studs 212, torque patch nuts 214, and a foam lining 216, each of which are also preferably disposed within the housing 102 underneath the inner wall 106 and configured for placement above the deck lid. As described in greater detail in connection with the process 900 of FIG. 9, the antenna system 104 is preferably integrated into the antenna spoiler 100 within the housing 102 after the housing 102 is manufactured using a blow molding process.

In one preferred embodiment, the antenna element 200 comprises a plate antenna element having an elongated shape and a flattened profile, and is positioned along the length of the antenna spoiler 100 within the housing 102 thereof. The antenna element 200 is preferably configured to receive amplitude modulation (am) radio signals and frequency modulation (fm) radio signals. The antenna element 200, as depicted for reference purposes, includes a first end 241, a second end 242, and a center region 240 extending therebetween. The antenna element 200 also preferably includes an embossment 237. Additional details regarding the antenna element 200 and the amplifier assembly 202 are provided further below in connection with the schematic diagram of FIG. 8, in accordance with an exemplary embodiment.

The support covers 206 are disposed within the housing 102, and are configured to support the antenna element 200 and the amplifier assembly 202 against the housing 102. Preferably, the support covers 206 support the antenna element 200 against the inner wall 106 of the housing 102. In the depicted embodiment, the antenna system 104 includes three support covers 206; namely, a first support cover 261, a second support cover 262, and a third support cover 263. Specifically, the first support cover 261 is disposed proximate the center region 240 of the antenna element 200, the second support cover 262 is disposed proximate the first end 241 of the antenna element 200, and the third support cover 263 is disposed proximate the second end 242 of the antenna element 200.

Each of the first, second, and third support covers 261, 262, and 263 supports the antenna element 200 against the housing 102, preferably against the inner wall 106 thereof In addition, the second support cover 262 also supports the amplifier assembly 202 against the housing 102, preferably against the inner wall 106 thereof in a center region of the housing 102 that is proximate the center region 240 of the antenna element 200. The support covers 206 are angled with respect to the antenna element 200 and the amplifier assembly 202 to provide optimal support and to effectively "sandwich" the antenna element 200 and the amplifier assembly 202 against the inner wall 106. The angle of the covers 206 respect to the antenna element 200 are preferably driven by design and antenna location. In one embodiment, the covers 206 are each made of acrylonitrile butadiene styrene and polycarbonate blend unfilled. These materials are selected for their excellent stability properties, but may vary in certain embodiments.

The supports 204 engage the embossment 237 of the antenna element 200. The supports 204 thereby assist in locating the antenna element 200 during manufacture of the antenna spoiler 100, positioning the antenna element 200 for optimal performance, and providing further support for the antenna element 200 against the housing 102, preferably against the inner wall 106 thereof The supports 204 preferably comprise fir tree supports. In the depicted embodiment, the antenna system 104 includes two fir tree supports 204, both of which are near the center region 240 of the antenna element 200 and spaced apart equally from the midpoint 250 of the center region 240. In one embodiment, the embossment 237 comprises a relatively small ring, and a tip of the support 204 (such as a push-pin) engages the embossment 237 to locate the antenna element 200 against an inner wall of the spoiler, and an interference fit is formed off of a foam lining.

The access cover nuts 208 and access cover screws 210 are utilized in coupling the support covers 206, the antenna element 200, and the amplifier assembly 202 against the housing 102, preferably against the inner wall 106 thereof. In one preferred embodiment, the antenna system 104 includes six access cover nuts 208 and eight access cover screws 210.

The studs 212 and the torque patch nuts 214 are utilized to secure the antenna spoiler against a deck lid of the vehicle. In one preferred embodiment, the antenna system 104 includes six studs 212 and six torque patch nuts 214.

The foam lining 216 is also disposed within the housing 102. The foam lining 216 helps to reduce unwanted water or other liquid intrusion and/or unwanted noise and/or vibrations associated with the antenna system 104. The foam lining 216 is preferably inserted and disposed between the antenna element 200 and the housing 102, most preferably underneath the antenna element 200 and between the antenna element 200 and a deck lid of the vehicle.

Figure 8:
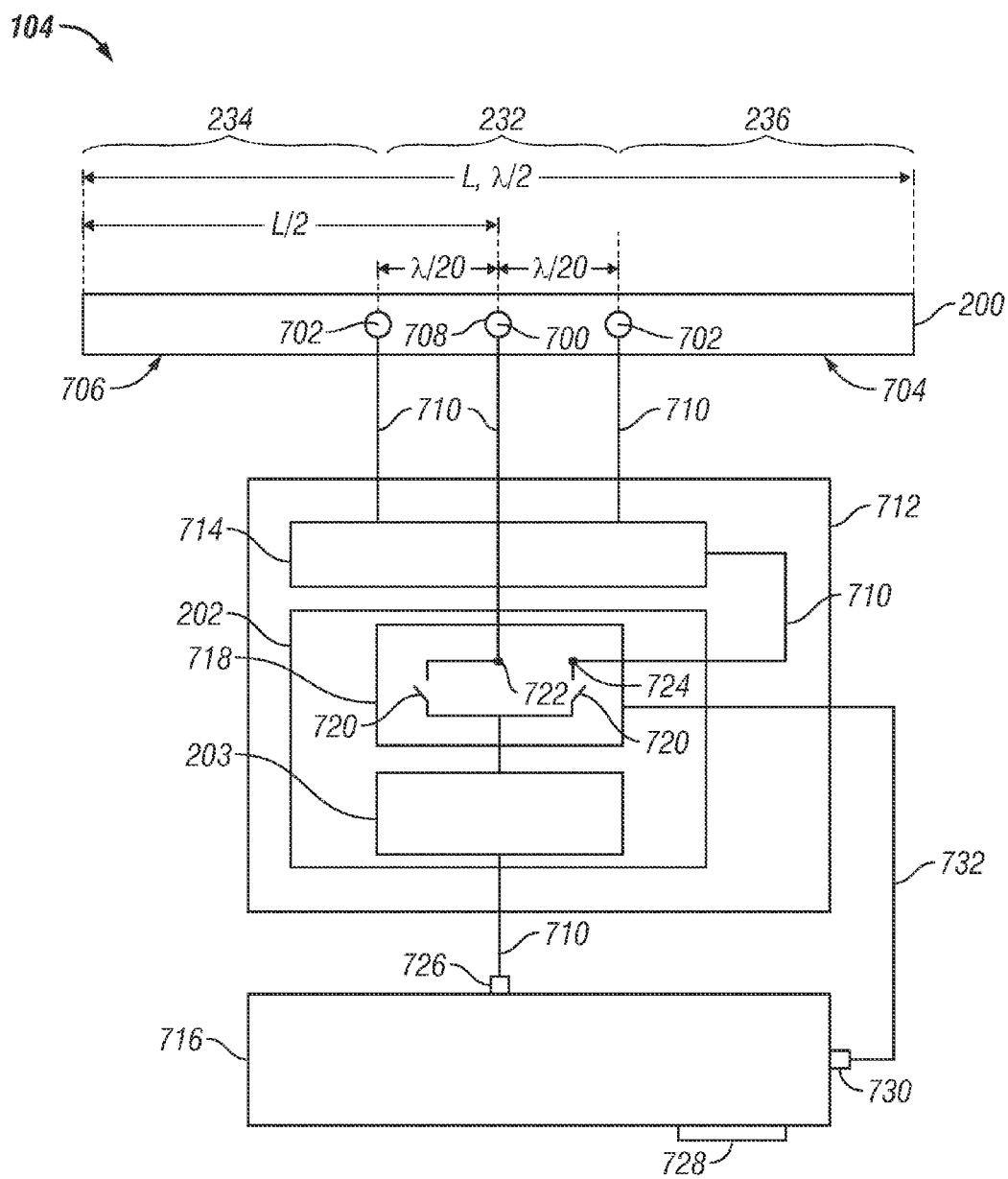
FIG. 8 is a schematic diagram of the antenna system of the antenna spoiler of FIG. 2, in accordance with an exemplary embodiment.

FIG. 8 is a functional block diagram of the antenna system 104 of the antenna spoiler 100 of FIGS. 1-7, in accordance with an exemplary embodiment. As depicted in FIG. 8, the antenna system 104 includes the above-referenced antenna element 200 (including first, second, and third antenna element components 232, 234, 236 thereof), a diversity module 712 having a diversity converter combiner along with the above-referenced amplifier assembly 202, and a receiver 716 (preferably an AM/FM receiver). In certain embodiments, the receiver 716, along with various other components of the antenna system 104, may also be disposed within the housing 102 referenced above in connection with FIGS. 1-6, in addition to the above-referenced antenna element 200 and amplifier assembly 202.

The antenna element 200 is in communication with the diversity module 712 through an electrical connection 710. The diversity module 712 is in communication with the AM/FM receiver 716 through the electrical connection 710 as well. The electrical connection 710 may comprise any type of transmission line for carrying radio frequency signals such as, for example, coaxial cable. Although FIG. 8 illustrates the diversity module 712 and the AM/FM receiver 716 as separate components, it should be noted that the diversity module 712 and the AM/FM receiver 716 can also be integrated within the antenna spoiler 100.The antenna element 200 is a half wave monopole antenna element for receiving radio frequency (RF) signals, and has an electrical length that is approximately half a wavelength (λ/2). In the embodiment as illustrated, the antenna element 200 receives frequency modulated (FM) and amplitude modulated (AM) signals. However, it is understood that the antenna element 200 may also be configured to receive other types of RF signals as well as long as the RF signals are of a higher frequency than AM or FM signals. Specifically, a mechanical length L of the antenna element 200 can be adjusted accordingly to match the particular wavelength of the RF signal being received, while still maintaining the electrical length of half a wavelength (λ/2). For example, the mechanical length L of the antenna element 200 could be adjusted accordingly for receiving satellite radio signals as well.

In the embodiment as illustrated, an electrical center 700 is located at approximately at a midpoint along the electrical length λ/2 of the antenna element 200. In the embodiment as illustrated, the electrical center 700 of the antenna element 200 is located at a distance L/2 that is about half the mechanical length L of the antenna element 200, at the mechanical center of the antenna element 200. However, one of skill in the art will appreciate that the electrical center 700 is not always located at the mechanical center of the antenna element 200.

The antenna element 200 receives AM and FM signals, and includes two FM feed points 702. One of the FM feed points 702 is located on a first side 704 of the antenna element 200, and the other FM feed point 702 is located on a second side 706 of the antenna element 200. The first side 704 of the antenna element 200 generally opposes the second side 706 of the antenna element 200, and the two FM electrical feed points 702 are located at about one-twentieth (λ/20) a wavelength from the electrical center 700. The antenna element 200 also includes an AM feed point 708 for receiving the AM RF signals. The AM feed point 708 is located at about the electrical center 700 of the antenna element 200.

Each of the FM feed points 702 allow for the acquisition of a separate FM RF signal, where a first signal corresponds with one of the FM electrical feed points 702, and a second signal corresponds with the other FM electrical feed point 702. It should be noted that while each FM feed point 702 includes a separate signal; both of the signals each originate the same radio transmittal. That is, the first signal and the second signal both represent the same radio transmittal, but the first signal is out of phase when compared to the second signal. Specifically, the phase difference between the first signal and the second signal is about ninety degrees (90°), which is caused by each FM feed point 702 being positioned at about one-twentieth (λ/20) a wavelength from the electrical center 700. The AM feed point 708 also allows for the acquisition of a separate AM signal as well.

The electrical connection 710 connects each of the FM feed points 702 as well as the AM feed point 708 to the diversity module 712. Alternatively, the FM feed points 702 and the AM feed point 708 may be directly connected to the receiver 716 via an antenna amplifier (such as the amplifier 203). The diversity module 712 includes an FM diversity combiner 714 as well as the AM/FM antenna amplifier assembly 202. The FM feed points 702 are connected to the FM diversity combiner 714, and the output of the FM diversity combiner 714 and the AM feed point 708 are each connected to an AM/FM antenna amplifier assembly 202. The diversity combiner 714 receives the first signal and the second signal from the FM feed points 702 and combines the signals into a single antenna signal, where the resultant signal is a composite of the first signal and the second signal.

The diversity combiner 714 may comprise any device that includes circuitry or control logic for combining two or more RF signals that each originate from the same radio transmittal. The diversity combiner 714 includes a processing module and associated memory used to store data. The processing module can include a microprocessor, digital signal processor, logic circuitry, analog circuitry, digital circuitry, or any other type of device that combines two different RF signals. One commercially available example of a diversity combiner is the Audio Signal Processor AN00001 manufactured by NXP Semiconductors, located in Eindhoven, The Netherlands.

The single antenna signal from the diversity combiner 714 and the AM RF signal from the AM feed point 708 are each sent to the AM/FM antenna amplifier assembly 202 through the electrical connection 710. The AM/FM antenna amplifier assembly 202 includes an antenna selecting circuit 718 for switching between the AM and the FM signals and an amplifier 203. In the embodiment as illustrated, the circuitry of the antenna selecting circuit 718 includes two switches 720 that are applied to respective input terminals 722, 724 of the AM and FM signals. The antenna selecting circuit 718 selects one of the AM and FM signals and sends the selected signal to the amplifier 203. Although FIG. 8 illustrates the antenna selecting circuit 718 including two switches for selecting a signal, the antenna selecting circuit 718 can include a microprocessor, digital signal processor, logic circuitry or any other type of device that can select between two different RF signals. The amplifier 203 includes circuitry for amplifying the signal selected by the antenna selecting circuit 718 to a predetermined level.

The amplifier 203 is in communication with an input 726 of the AM/FM receiver 716 through the electrical connection 710. The AM/FM receiver 716 is a radio head unit including an AM/FM tuner 728 to switch between AM and FM radio broadcasts, and may also include sound processing circuitry, signal processing circuits, and one or more media players such as, for example, a compact disk (CD) player or an MP3 player. The AM/FM receiver 716 also includes an output 730 in communication with the AM/FM switching amplifier assembly 202 through an output line 732, where the output line 732 can be either a data network or a direct signal wire. When a user switches between an AM and an FM broadcast using the AM/FM tuner 728, the AM/FM receiver 716 sends a data signal through the output line 732 to the AM/FM antenna amplifier assembly 202.

The AM/FM antenna amplifier assembly 202 includes circuitry or control logic (not shown) for detecting the output of the AM/FM tuner 728. The circuitry or control logic instructs the antenna selecting circuit 718 to switch between the AM or the FM signal based on the output of the AM/FM tuner 728. For example, if a user selects an FM broadcast using the AM/FM tuner 728, the switch 720 of the antenna selecting circuit 718 connected to the input terminal of the AM signal 722 will be switched to an off position, while the switch 720 connected to the input terminal of the FM signal 724 will switch to an on position. The FM signal is then transmitted from the selecting circuit 718 to the amplifier 203, and to the AM/FM receiver 716 for reception. A user can also further select a specific radio broadcast channel within the RF operating band (i.e., between 87.7 megahertz to 108 megahertz for FM reception) by using the AM/FM tuner 728. In one embodiment, the electrical make-up and operation of the antenna system 104 (including its configuration for and use of RF signals) utilizes features similar to those described in commonly-assigned U.S. patent application Ser. No. 12/700,515 filed on Feb. 4, 2010, the entirety of which is incorporated herein by reference.

Figure 9:
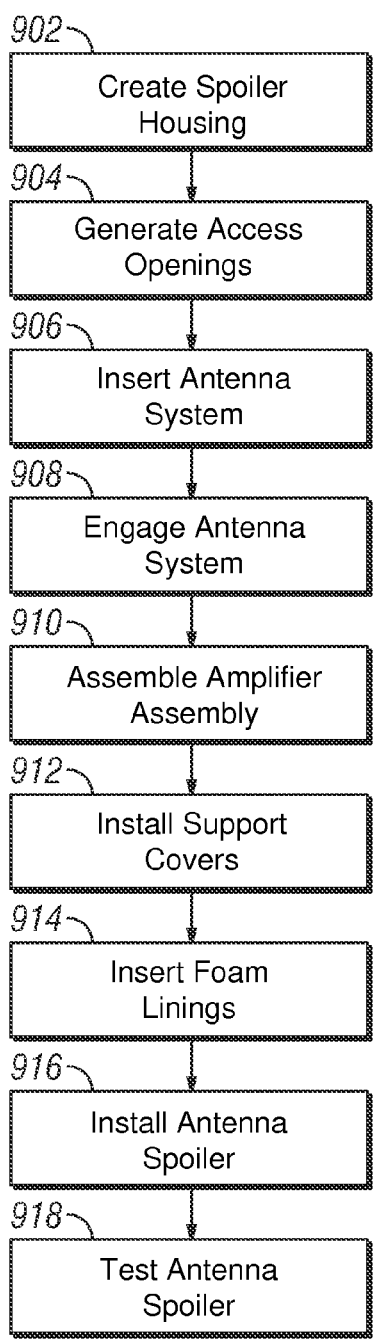
FIG. 9 is a flowchart of a process of manufacturing an antenna spoiler, such as the antenna spoiler of FIG. 2, in accordance with an exemplary embodiment.

FIG. 9 is a flowchart of a process 900 of manufacturing an antenna spoiler for a vehicle, such as the antenna spoiler 100 referenced above in connection with FIGS. 1-7, in accordance with an exemplary embodiment. The process 900 includes the step of creating a spoiler housing (step 902). The spoiler housing preferably corresponds to the housing 102 described above in connection with FIGS. 1-7. The spoiler housing is created in step 902 using a blow molding technique. Preferably, during this blow molding technique, a plastic substance (most preferably, an ABS plastic material) is heated to generate a parison or pre-form structure, and is then cooled to form the spoiler housing. Specifically, the blow molding technique preferably results in a plastic shell for the housing, preferably including the inner and outer walls 106, 108 of the housing 102 referenced above in connection with FIGS. 1-6. Blow molding has proven to be advantageous for the process 900, for example because blow molding provides an improved "one piece" shell strength. By comparison, injection molding would require two or more pieces. The one-piece blow molding technique provides for a potential increase in strength as well as noise reduction and assembly reduction.

Access openings are generated within the spoiler housing (step 904). The access openings are generated to provide sufficient clearance for the antenna system 104 to slide within the housing 102. In a preferred embodiment, three access openings are generated and utilized in the process 900. Each of the three openings preferably correspond with, and is approximately the same size and shape as, a respective one of the support covers 261, 262, and 263 of FIGS. 2-7. A left opening (corresponding to support cover 262 of FIGS. 1-6) is used to slide and load the antenna element. A middle opening (corresponding to support cover 261 of FIGS. 1-6) is used as a visual load window to visually confirm proper placement of the antenna element. A right opening (corresponding to support cover 263 of FIGS. 1-6) is also used as a load window to visually conform proper placement of the antenna element. The access openings are preferably generated via a CNC technique following the blow molding of step 902 in order to generate cutouts in the spoiler housing shell through which the components of the antenna system may be inserted.

An antenna system is inserted within the spoiler housing (step 906). The antenna system preferably corresponds to the antenna system 104 of FIGS. 1-7. During step 906, the antenna system (including an antenna element and amplifier thereof) are preferably slid through the access openings and/or cutouts and into the spoiler housing. In certain embodiments, an antenna receiver and/or other antenna system components may also be slid through the access openings into the spoiler housing during step 906.

The antenna system is engaged by a plurality of supports (step 908). Specifically, the antenna element of the antenna system is preferably engaged by the supports. The supports preferably correspond to the supports 204 referenced above in connection with FIGS. 2-4, 6 and comprise fir tree supports. During step 908, the supports 204 help to locate and align the antenna element 200 via the embossment, and further help to properly position the antenna element 200 for optimal performance and support the antenna element 200 against the inner wall 106 of the housing 102.

The amplifier assembly 202 is then assembled (step 910). Specifically, the various components of the amplifier assembly are assembled. The amplifier assembly preferably corresponds to the amplifier assembly 202 referenced above in connection with FIGS. 1-7, and includes the amplifier 203 along with associated wiring and other components, such as those described above in connection with FIG. 8.

Support covers are installed (step 912). The support covers preferably correspond to the support covers 206 of FIGS. 2-4, 6. Specifically, the first support cover 261 of FIGS. 2-4, 6 preferably supports the amplifier assembly against the spoiler housing, preferably against the inner wall thereof In addition, each of the first, second, and third support covers 261, 262, 263 of FIGS. 2-4, 6 preferably support the antenna element against the spoiler housing, preferably against the inner wall thereof During step 912, the first support cover 261 is preferably installed first, followed by the second and third support covers 262, 263. Also during step 912, access cover nuts 208 and access cover screws 210 of FIGS. 2-4, 6 are utilized in coupling the support covers 206, the antenna element 200, and the amplifier assembly 202 against the housing 102, preferably against the inner wall 106 thereof A foam lining is then inserted within the spoiler housing (step 914). The foam lining is preferably inserted underneath the antenna element. The foam ling helps to reduce unwanted water or other liquid intrusion and/or unwanted noise and/or vibration from the antenna system. The foam lining preferably corresponds to the foam lining 216 referenced above in connection with FIGS. 2-4, 6. The foam lining is preferably inserted and disposed between the antenna element 200 and the deck lid of the vehicle.

Figure 10:
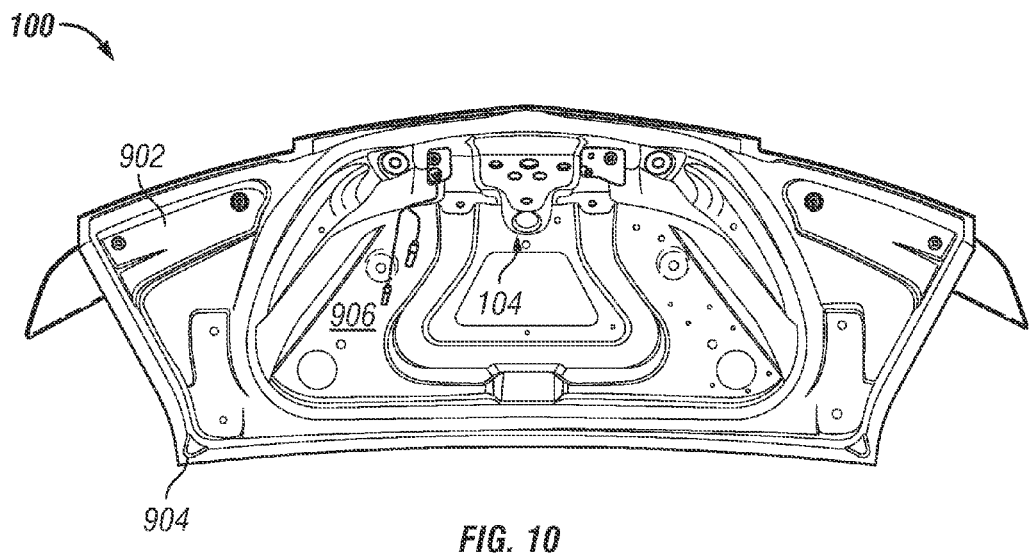
FIG. 10 is a schematic view of the antenna spoiler of FIG. 1, depicted showing a bottom surface of the antenna spoiler and also showing the antenna spoiler coupling to a deck lid of the vehicle, in accordance with an exemplary embodiment.
Figure 11:
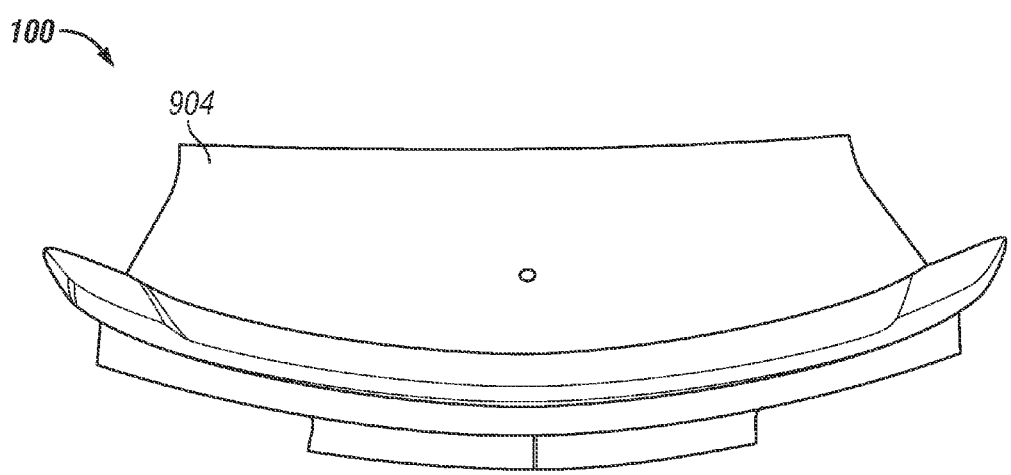
FIG. 11 is a schematic view of the antenna spoiler of FIG. 1, depicted showing a top view of an outer surface of the deck lid surrounding the antenna spoiler, in accordance with an exemplary embodiment.

The deck lid preferably corresponds to the deck lid 30 of FIG. 1. In addition, FIGS. 10-11 illustrates the placement and attachment of the antenna spoiler 100 with respect to the deck lid 30. Specifically, FIG. 10 is a schematic view of the antenna spoiler 100 referenced above in connection with FIGS. 1-9, depicted from a bottom view. FIG. 10 provides a schematic view of the antenna assembly 100 inside a trunk 906 of the vehicle, and shown with respect to an inner surface 902 and an outer surface 904 of the deck lid 30 of FIG. 1. FIG. 11 is a schematic view of the antenna spoiler 100 as seen from a top view, with the outer surface 904 visible outside the vehicle.

Returning now to FIG. 9, the antenna spoiler can then be installed into the deck lid of the vehicle (step 916). In a preferred embodiment, wires are run from the antenna system (most preferably from the amplifier and/or the amplifier assembly) to a connection or connector underneath the deck lid. The wires are preferably run through the deck lid. The antenna spoiler is preferably initially retained in place via a clip, and is then secured against the deck lid via the studs 212 and the torque patch nuts 214 referenced above in connection with FIGS. 2-4, 6.

In addition, the antenna spoiler may be tested (step 918). Specifically, the antenna spoiler is preferably tested to ensure that radio signals from the applicable frequencies (preferably AM and FM) are received appropriately by the antenna system.

Accordingly, improved antenna spoilers are provided for vehicles, along with improved methods for manufacturing vehicle antenna spoilers. The disclosed antenna spoilers include an antenna element and amplifier integrated together within a blow molded, deck lid spoiler of a vehicle. The antenna spoilers and methods disclosed herein provide for a sleek and efficient antenna system for a vehicle within the spoiler of the vehicle, and provide performance on par with traditional glass-mounted antennas. The disclosed antenna spoilers and methods allow for improved flexibility in placement of the antenna system, for example in convertible automobiles and other vehicles in which other antenna mounting locations may be less desirable. The disclosed antenna spoilers and methods also provide an improved appearance for the vehicle with an antenna system that is out of view.

It will be appreciated that the disclosed vehicle antenna spoilers and methods may vary from those depicted in the Figures and described herein. For example, the antenna element and/or other components of the antenna system may vary in different embodiments. In addition, it will be appreciated that certain steps of the process 900 may vary from those depicted in FIG. 9 and/or described above in connection therewith. It will similarly be appreciated that certain steps of the process 900 may occur simultaneously or in a different order than that depicted in FIG. 9 and/or described above in connection therewith. It will similarly be appreciated that the disclosed vehicle spoilers and methods may be implemented and/or utilized in connection with any number of different types of automobiles, sedans, sport utility vehicles, trucks, any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. An antenna spoiler for a vehicle, the antenna spoiler comprising:
   a spoiler housing;
   an antenna element disposed within the spoiler housing; and
   an amplifier assembly coupled to the antenna element and disposed within the spoiler housing; and
   wherein the spoiler housing comprises an inner wall, and the antenna spoiler further comprises: a plurality of support covers configured to support the antenna element against the inner wall.

2. The antenna spoiler of claim 1, wherein the antenna element is configured to receive amplitude modulation (am) radio signals.

3. The antenna spoiler of claim 1, wherein the antenna element is also configured to receive frequency modulation (fm) radio signals.

4. The antenna spoiler of claim 1, wherein:
   the spoiler housing defines an interior region; and
   the antenna element and the amplifier assembly are disposed entirely within the inner region.

5. The antenna spoiler of claim 1, further comprising:
   a foam lining disposed within the spoiler housing.

6. The antenna spoiler of claim 1, further comprising:
   an embossment formed on the antenna element; and
   a support configured to engage the embossment.

7. The antenna spoiler of claim 6, wherein the support comprises a fir tree support.

8. A method of manufacturing an antenna spoiler for a vehicle, the method comprising the steps of:
   creating a spoiler housing via blow molding; and
   inserting an antenna system within the spoiler housing for the antenna spoiler; and
   wherein the spoiler housing has an inner wall, and the step of inserting the antenna system further comprises the steps of: sliding the antenna system through the access openings; and supporting the antenna system against the inner wall with a support cover; and
   wherein the step of inserting the antenna system comprises the step of: inserting an antenna element and an amplifier assembly within the spoiler housing.

9. The method of claim 8, wherein the step of inserting the antenna system comprises the steps of: creating access openings within the spoiler housing; and inserting the antenna system within the access openings.

10. The method of claim 8, further comprising the step of: inserting a foam lining inside the spoiler housing.

11. The method of claim 8, wherein the antenna element includes an embossment, and the step of inserting the antenna system further comprises the step of: engaging the embossment with a support.

12. The method of claim 11, wherein the step of engaging the embossment with the support comprises the step of: engaging the embossment with a fir tree support.

13. An antenna spoiler for a vehicle, the antenna spoiler comprising:
   a spoiler housing; and
   an antenna system disposed within the spoiler housing, the antenna system comprising:
   an antenna element disposed within the spoiler housing and configured to receive amplitude modulation (am) radio signals and frequency modulation (fm) radio signals; and
   an amplifier coupled to the antenna element and disposed within the spoiler housing; and
   wherein the spoiler housing comprises an inner wall, and the antenna spoiler further comprises: a plurality of support covers configured to support the antenna element against the inner wall.

14. The antenna spoiler of claim 13, further comprising:
   an embossment formed on the antenna element; and
   a support configured to engage the embossment.

15. The antenna spoiler of claim 14, wherein the support comprises a fir tree support.

16. The antenna spoiler of claim 13, wherein:
   the spoiler housing defines an interior region; and
   the antenna element and the amplifier assembly are disposed entirely within the inner region.

* * * * *